United States Patent
Rushforth et al.

[11] 3,906,987
[45] Sept. 23, 1975

[54] SWING OPEN CROSS-CONNECTION VALVE

[75] Inventors: Calvin Rushforth, Andover; Sebastian David Tine, Lawrence, both of Mass.

[73] Assignee: Watts Regulator Company, Lawrence, Mass.

[22] Filed: Mar. 13, 1974

[21] Appl. No.: 450,594

[52] U.S. Cl. .............. 137/218; 137/327; 137/522; 137/583
[51] Int. Cl............................................ F16k 17/04
[58] Field of Search .......... 137/218, 285, 315, 316, 137/326, 327, 328, 329.1, 329.2, 329.3, 329.4, 522, 523, 583, 584, 585; 251/90

[56] References Cited
UNITED STATES PATENTS

| | | | |
|---|---|---|---|
| 3,379,210 | 4/1968 | Wheeler | 137/327 |
| 3,496,951 | 2/1970 | Stang, Jr. et al. | 137/584 X |
| 3,636,968 | 1/1972 | Tine | 137/102 |
| 3,747,621 | 7/1973 | Tine | 137/218 |

Primary Examiner—William R. Cline
Attorney, Agent, or Firm—Norman Lettvin

[57] ABSTRACT

A cross-connection valve, with upstream and downstream valving, which prevents backflow from contaminating the source of liquid is provided with field serviceability features by arranging the upstream valving and backflow discharge passageway means on an access door that normally serves as part of the valve body. A tool is arranged to enter through the discharge passage to hold the upstream valving in assembled condition on the access door, to permit field servicing for repair or replacement of the upstream valving, when the access door is open, and the downstream valving is also accessible for field servicing through the opening for the access door.

9 Claims, 6 Drawing Figures

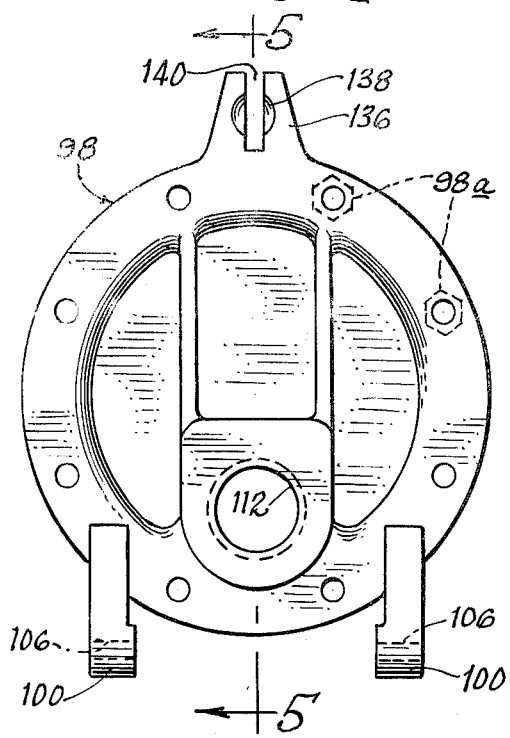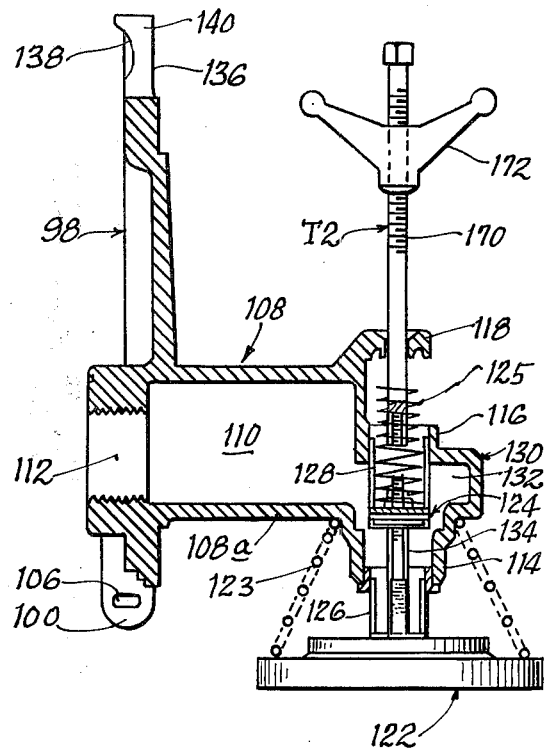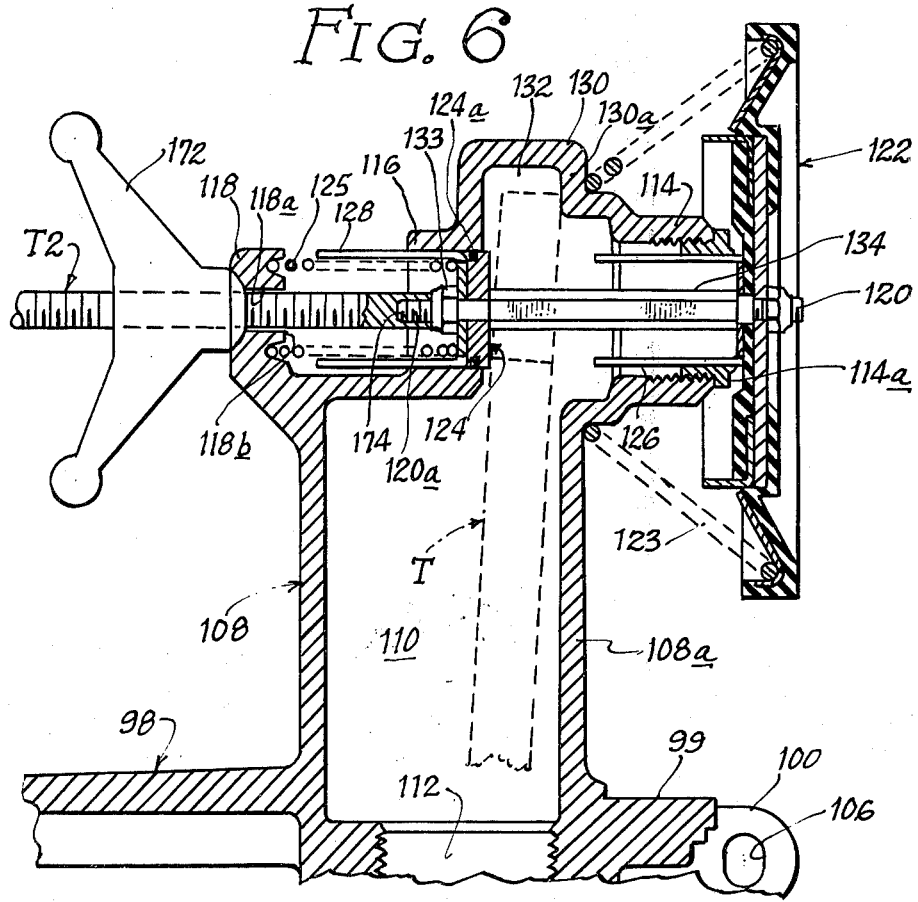

SWING OPEN CROSS-CONNECTION VALVE

BACKGROUND OF THE INVENTION

This invention relates to a cross-connection valve of the type which prevents, and protects against, a backflow contaminating the supply of water or other liquid and which effects discharge of backflow from the valve through a discharge passage intermediate the inlet and outlet ends of the valve. Present national standards for backflow-preventing valves have established the desirability of providing a cross-connection valve which will permit the internal valve elements thereof to be serviced or replaced in the field without the necessity of removing the main body of the valve from the flow line. For larger size valves, such as 2 inch and above, the ASSE Standard No. 1013 and AWWA C506-69 require such service access.

Successful cross-connection valves have heretofore been disclosed in U.S. Pat. Nos. 3,636,968 and 3,747,621. In such valves there are provided upstream and downstream flow valving arrangements and a discharge passageway, normally closed by balanced valving, for discharging backflow from the region of said valve between said upstream and downstream valving. Since the upstream flow valving in such patents must be closed in the event of a backflow, so that the backflow will not contaminate the source, a relatively strong positive bias is imposed upon the upstream flow valving. With valves of large size the bias required is relatively large and the springs used are powerful enough so that they pose a very substantial problem of reassembly in the event the elements of the valving should become dislocated during servicing of the valve.

U.S. Pat. No. 3,747,621 seeks to partially obviate the reassembly problem and provide for field servicing by providing a modular construction that can be used in field servicing without removing the very heavy valve body itself from its in-line position in the field. However, for the larger diameter valves even a module becomes a heavy and bulky object that may present additional problems when field servicing is required. Therefore, a problem remains as to how to effectively, efficiently and economically service in the field large cross-connection backflow preventing valves.

It is, therefore, an object of this invention to provide a backflow preventer valve having access features which permit servicing of elements of the valve without requiring removal of the valve body from the flow line and which will meet the established national standards, and at the same time conveniently presents the spring-biased elements of the valve in such a way as to make the servicing thereof convenient, readily accessible, efficient and inexpensive while avoiding the expense that would accompany unintended dislocation of the bias elements of the valve.

It sometimes is necessary to disassemble the valving elements of the cross-connection valve during field servicing and this requires permitting the springs to expand to their free length.

It is yet another object of this invention to provide a backflow preventer valve with features that provide for effective and efficient reassembly in the field of the elements of the valve.

These and other objects of this invention will become apparent from the following description and appended claims.

SUMMARY OF THE INVENTION

By virtue of this invention, there is provided a backflow preventer valve which accomplishes the objects of this invention by providing the valve body with an access door upon which is carried the upstream valving of the backflow preventer and the backflow discharge passage for the valve. A forked maintenance tool of a size and shape to enter the discharge passage and to cooperate with body portions thereof is provided to engage and hold portions of the upstream valving assembled when the access door is opened. When the access door is opened all valve elements and valve seats, including the upstream and downstream valving may be conveniently serviced. In the event that it is necessary to disassemble some of the valving during servicing, a structure is provided which permits selective release of the bias springs by simple tools and thereafter facilitates reassembly of the valve elements.

The mounting of upstream valving on the access door affords inexpensive servicing and reduced labor costs, and has the additional advantage that there is a considerable savings in terms of initial cost and weight inasmuch as only one access through the valve body is necessary to service all valve elements and valve seats of the backflow preventer. By virtue of this construction, there is a considerable saving in weight of material alone, and since the valve housing is made of bronze, such weight reduction represents a substantial reduction of initial cost.

BRIEF DESCRIPTION OF THE DRAWINGS

FIG. 4 is a plan view of the access door, as would be seen looking upwardly from a position below FIG. 1 but turned 90°;

FIG. 5 is an enlarged cross-sectional view showing the access door and upstream valving thereon in a condition with the bias springs expanded and with an assembly tool arranged prior to recompression of the bias springs to their condition as shown in FIGS. 1 and 2; and FIG. 6 is an enlarged fragmentary cross-sectional view of the access door and upstream valving thereon showing how the tool in FIG. 5 has recompressed the bias springs, and how the tool of FIGS. 2 and 3 has been inserted as in FIG. 2 to hold the upstream valving assembled and compressed prior to removal of the assembly tool of FIG. 5.

DESCRIPTION OF THE PREFERRED EMBODIMENTS

Figure 1:
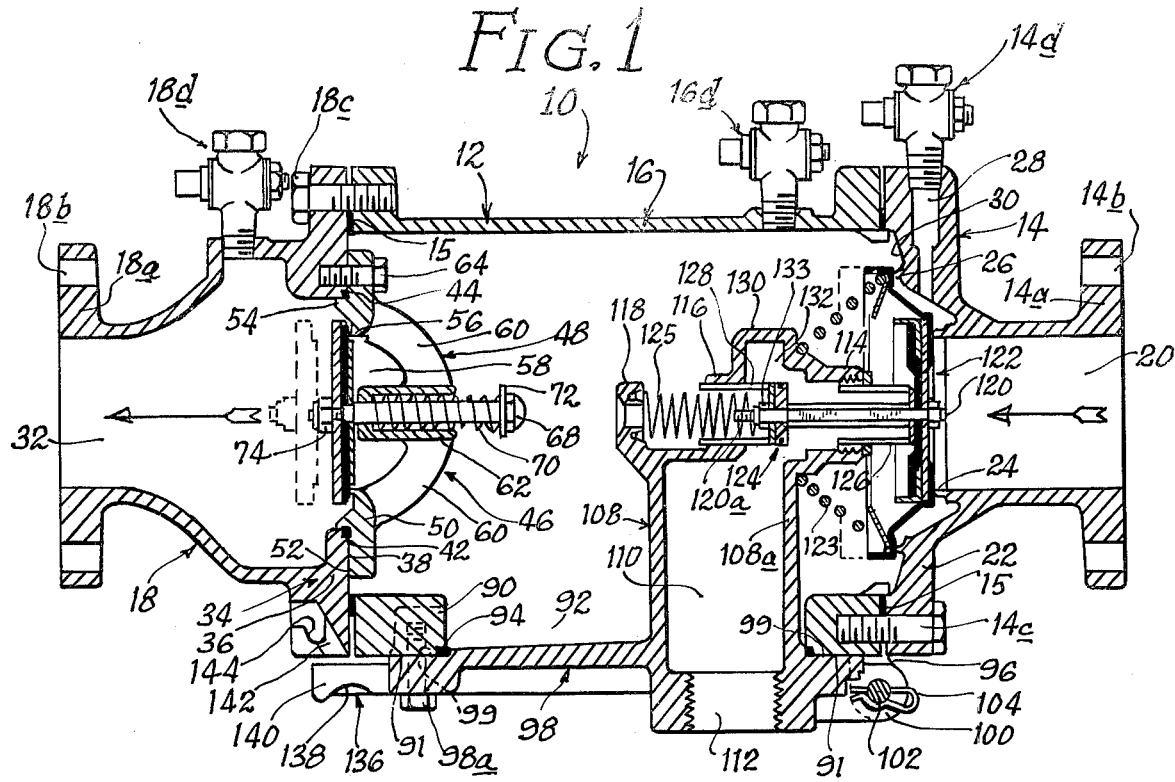
FIG. 1 is a longitudinal cross-sectional view taken substantially through the longitudinal axis of the valve body and showing the internal valve elements of the valve with the access door in its closed position.

Referring now to the drawings, the cross-connection, backflow preventer valve is generally indicated at 10 having a body 12 formed in three sections, an upstream flanged inlet section 14, a central section 16, and a downstream flanged outlet section 18. Sections 14 and 18 have respective upstream and downstream flanges 14a and 18a provided respectively with a series of bolt holes 14b and 18b arranged circularly therethrough, as well known in the art, adapted for securing valve 10 in a flow line for liquids such as water. The center section 16 is secured to sections 14 and 18 by means of series of bolts 14c and 18c through abutting joints, gasketed at 15 between adjacent flanges, as well known in the art.

Each section 14, 16 and 18 is provided with one or more valved fittings, respectively 14d, 16d and 18d that may serve as a pressure tap, or vent, again as known in the art.

The upstream section 14 defines an inlet 20 for incoming flow of liquid. Section 14 has a downstream flange 22. The interior of section 14 is shaped to define an upstream, or first circular valve seat 24 and a second circular valve seat 26 of greater diameter than valve seat 24 and spaced downstream of valve seat 24. The flange 22 is radially bored at 28 to communicate at its outer end with fitting 14d and at its inner end with a flow region located axially between valve seats 24 and 26. The downstream surface outwardly of valve seat 26 is relieved or recessed at 30 in an upstream direction.

The downstream section 18 defines an outlet 32 for liquid passing through valve 10. Section 18 has an upstream flange 34 with a radially inward, annular enlargement 36 that presents an upstream facing, flat mounting face 38 and a centering sleeve 40 that is notched at 42 for receiving a gasket 44.

Downstream valving, generally 46, for valve 10 is secured to the upstream face 38 of section 18. Valving 46 is to be serviced through an access opening in section 16. Valving 46 includes a spider, generally 48, comprising a continuous annular mounting ring 50 with outwardly located abutting face 52 for engaging face 38 and annular flange 54 for guiding entry into centering sleeve 40, and radially inwardly located, downstream facing and projecting valve seat 56 surrounding a central flow aperture 58. A plurality of upstream extending, arched arms 60 support an elongated cup-shaped, center mount 62 that extends upstream relative to valve seat 56. The ring 50 is secured to section 18 by a plurality of bolts 64. Gasket 44 provides a seal between spider 48 and section 18.

The downstream valving 46 includes an elongated, headed, valve stem 68 slidably arranged within cup-shaped mount 62 with a helical bias spring 70 under compression surrounding stem 68 and positioned between the annular base of mount 62 and a washer 72 abutting the head of the valve stem. The end of stem 68 extending downstream of mount 62 is reduced to provide a downstream facing annular abutment shoulder on stem 68 against which a valve element assembly is compressed by a nut 74 threaded onto the screw-threaded terminal portion of stem 68. The valve element assembly includes resilient valving disc 76 sandwiched between an upstream washer 78 of smaller dimension than the diameter of valve seat 56 and a downstream backing plate 80 having an upstream projecting peripheral flange 82 that surrounds and confines the periphery of resilient disc 76. The disc 76 is of a size selected to properly sealingly seat against valve seat 56.

The center section 16 is of generally tubular cross-section as its interior is to transmit flow between inlet section 14 and outlet section 18. However, one portion of the longitudinal side wall of section 16 is provided with an access opening that is normally closed by an access door. The portion of the wall of section 16 having the access opening therein is appropriately flatted, or made planar, to sealingly cooperate with an abutting surface on an access door. In FIG. 1, the portion of section 16 with the access opening is shown at the lower edge of the illustration, but it should be understood that the view shown is of a horizontal cross-section, so that the access door preferably pivots about an upright axis. The casing section 16 is shaped to provide an annular aperture-surrounding section 90 with a flat abutment face 91 that surrounds an access opening 92. A peripheral notch 94 receives therein a door-engaging sealing gasket 94, preferably an O-ring or the equivalent. Casing section 16 also is provided, adjacent its upstream end and outwardly of abutment face 91, with a pair of spaced, aligned, apertured hinge-pin receiving ears 96.

An access door 98 whose outer periphery is best seen in FIG. 4, is also provided with a pair of spaced, aligned, apertured hinge-pin receiving ears 100. Door 98 provides an annular abutment surface 99 for sealing engagement against face 91. By arranging one pair of ears to embrace the other pair of ears, the door 98 is properly maintained in position on casing section 16 by hinge-pin means 102 extending through the pairs of ears, and by use of a cooperating cotter pin means 104, as is well known in the hinging art. As described hereinafter, certain of the upstream valving means are carried on the access door 98, and in order to insure both proper cooperation and seating of such valving elements with the fixed valve seats 24 and 26 on inlet section 14, and to secure proper abutment between surfaces 99 and 91, the hinge-pin receiving apertures 106 in one of the two sets of ears is elongated to provide for lost motion at the hinge-pin joint. Preferably, the elongated hinging holes 106 are in the ears 100 of the door, as shown in FIG. 6.

Considering now the construction of the access door 98, there is provided on the inner wall of door 98 an elongated tubular section 108 that extends transversely to the plane of door 98 to the extent that when door 98 is closed certain valve mounting elements at the inner end of section 108 are arranged centrally of section 16 to hold valving elements properly positioned within section 16. Tubular section 108 surrounds and defines a backflow discharge passageway means 110 that opens outwardly of section 14 through a tapped discharge opening 112 outwardly of door 98.

At the inner end of section 108 are provided spaced upstream and downstream sleeves, respectively 114 and 116, and a downstream spaced spring abutment 118. The longitudinal axes of sleeves 114, 116 and of abutment 118 are substantially coaxial of the longitudinal axis of casing sections 14 and 16. The upstream valving includes an elongated valve stem 120 mounting thereon in spaced relation, a disc-like valve means generally 122, and a cylindrical plug-type valve 124. In the position shown in FIG. 6 the downstream valve disc of valve means 122 is almost seated against an annular valve seat 114a carried on sleeve 114, while the O-ring seal 124a of valve 124 has already sealingly engaged the inner wall of sleeve 116.

In FIG. 1 both valves 122 and 124 are projected toward an upstream position under bias of a first-spring 123, of frusto-conical configuration whose smallest diameter seats on the exterior structure surrounding upstream sleeve 114 and whose large diameter engages a downstream portion of disc valve 122, and a second cylindrical compression coil spring 125 positioned between abutment 118 and plug-type valve 124.

The valve stem 120 also carries downstream-extending, spider-like, apertured slide guides 126 and 128, respectively arranged for guiding cooperation with sleeves 114 and 116. When the disc valve 122 is in the position of FIG. 1 as when backflow is occurring, so that valve 122 seats against valve seats 24 and 26, backflow may pass over and through guides 126 and 128 to enter discharge passageway means 110. When a flow is established from inlet section 14 and the valve 122 is correspondingly moved downstream, the sleeves 114 and 116 are effectively closed off by valves 122 and 124 to prevent contamination of the inflow by a backflow through passageway means 110.

The downstream sleeve 116 is spaced downstream of a plane that is transverse to door 98 and in which lies the upstream wall 108a of tubular section 108. Positioned axially between sleeves 114 and 116 there is provided a structural bulge 130 that provides a recess 132 bounded respectively at upstream and downstream sides by walls 130a and 130b, with wall 130a substantially in the plane of the upstream wall 108a and with wall 130b at the upstream edge of sleeve 116 as clearly illustrated in FIGS. 1, 2, 5 and 6.

The downstream terminus of valve stem 120 is threaded at 120a, to receive assembly nut 133 for holding valve 124 and guide 128 against the downstream shoulder, or edge, of a spacer portion 134 of hex shape defined on stem 120 and located between valves 122 and 124, and also for cooperation with a tool as hereinafter described. The spring abutment 118 is centrally apertured at 118a at a dimension larger than the diameter of stem 120 to permit entry therethrough of a tool that cooperates with stem 120. Abutment 118 has an annular sleeve-like boss 118b for centering cooperation with spring 125.

A control portion 136 is provided on door 98 projecting oppositely of the direction of projection of ears 100 from door 98. Control portion 136 is provided with a ball seat 138 thereon that is bifurcated by slot 140. The slot 140 is aligned with a slot 142 provided in adjacent flange 34 of outlet section 18. Slot 142 intersects an elongated cross-slot 144 that opens laterally through the downstream facing wall of flange 34. Cross-slot 144 provides a cradle for receiving thereinto a cross bar 146 of a door opening tool 148 shown in broken lines in FIG. 2. The tool 148 includes a threaded rod 150 having the cross bar 146 secured at one end thereof and carrying a threaded, flanged nut 152 for controlled movement along the rod 150. The nut 152 has a ball-shaped face 154 for seating in ball seat 138.

Figure 2:
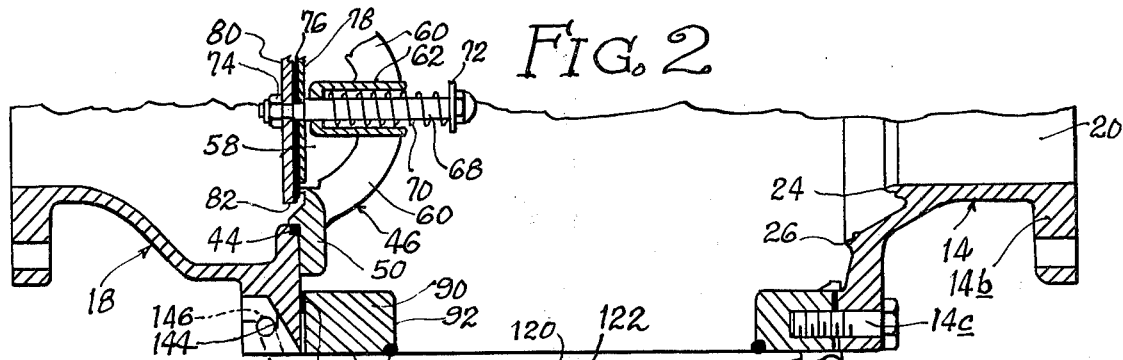
FIG. 2 is a fragmentary view similar to FIG. 1 showing only the access door of the valve body in an open position and with the biasing springs of the upstream valving assembly held in assembled position by a servicing tool entered through the backflow discharge passage carried by the access door.
Figure 3:
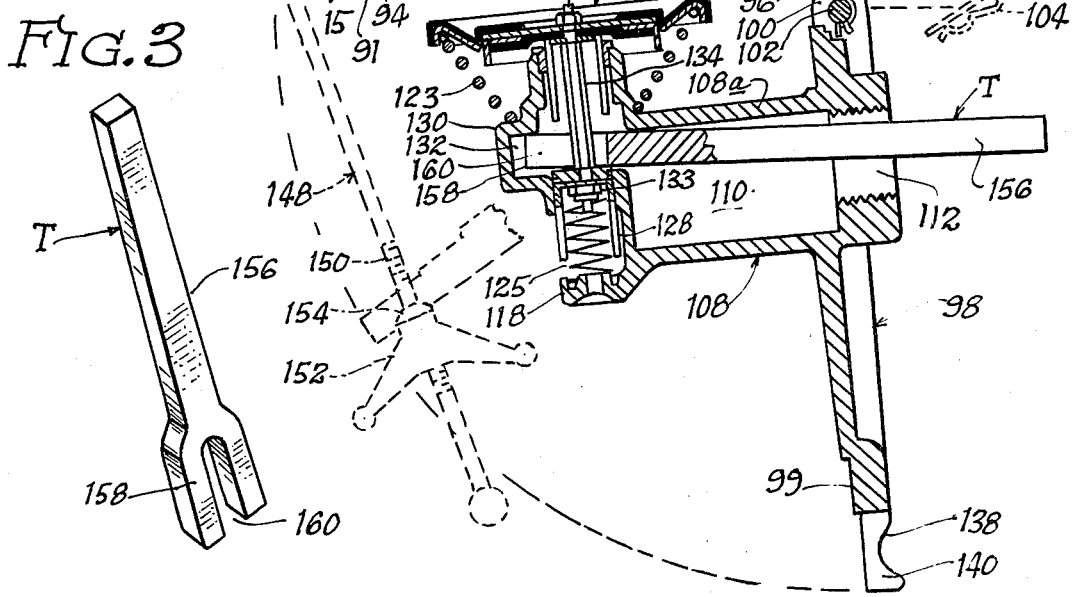
FIG. 3 is a perspective view of the forked servicing tool that is shown in use in FIG. 2.

A special tool T is provided to be used to capture and hold the upstream valving in position when the access door 98 is to be opened. The special tool T is shown in FIG. 3 and its use is illustrated in FIGS. 2 and 6. Tool T has an elongated handle 156 and a forked, or bifurcated, head 158 whose slot 160 is of a size to embrace the hex portion 134 of stem 120.

If servicing is to occur, with the inlet liquid pressure applied so that the valves 122 and 124 are in their flow position, the tool T is inserted in passageway 110 using wall 108a as an abutment guide until the tool's head 158 enters recess 132, with the hex portion 134 of stem 120 received in the tool's slot 160. The water upstream the valve 10 is then cut off by an upstream valve not shown. With the upstream pressure off, the upstream valving will tend to move toward the position of FIG. 1 under the bias of springs 123 and 125, but the tool T then becomes wedged in position and serves to capture the valving in the position of FIG. 2 with the springs 123 and 125 kept compressed and assembled, while the wedged-in tool T at the same time cannot be inadvertently removed. After removing the bolts 98a that hold access door 98 closed, and with a tool such as 148 operatively connected, the door 98 may be slowly opened until the liquid within casing section 16 escapes through access opening 92. When door 98 is swung fully open the upstream valving is fully exposed exteriorly of casing 16 for servicing. The size of access opening 92 is selected so that tubular section 108 and all valve elements carried thereon swings through opening 92 when door 98 is fully open as seen in FIG. 2. Access may also then be had to the downstream valving for servicing. Removal of bolts 64 permits withdrawal of the entire downstream valve cartridge 48.

If it is desired to permit the springs of the upstream valving to expand subject to field re-assembly, that can be accomplished by use of the tool T2 shown in FIGS. 5 and 6. The tool T2 includes a rod 170 threaded exteriorly to have a threaded, flanged nut 172 controllably move along the length thereof. One end of rod 170 is internally tapped at 174 to secure to the threaded end of valve stem 120. The rod 170 slidably passes through aperture 118a and secures to stem 120, thereby capturing stem 120. Then, with nut 172 engaging abutment 118, the springs 123 and 125 may be compressed to relieve the capture pressure on tool T and to permit removal of tool T from passageway 110. Thereafter, by backing off nut 172, springs 123 and 125 may expand to their full length for servicing. To re-assemble, the procedures are reversed in that tool T2 compresses springs 123 and 125 to a point permitting reinsertion of tool T, after which tool T2 is disconnected. After the door 98 is closed and bolted shut, and with the pressure from incoming fluid reapplied, the valves move to a position where tool T is released.

The elongated hinging holes 106 permit the abutment surface 99 of the access cover to mate and seal against the cooperating surface 91 of section 16 when the flange bolts cover bolts 98a are tightened. Since the movable elements of the upstream valving is carried by the access door 98, springs 123 and 125 acting against valve seats 26 and 24 aid in biasing the door 98 toward open position after the cover bolts 98a have been removed.

It will be appreciated that numerous changes and modifications can be made to the embodiment described herein without departing from the spirit and scope of this invention.

What is claimed and desired to be secured by Letters Patent of the United States is:

1. In a backflow preventer valve system that includes spaced upstream and downstream valve means arranged to normally prevent a backflow, and a backflow discharge means located between said upstream and downstream valve means, the improvement of a field serviceable backflow preventer comprising, in combination:

an elongated valve casing having upstream and downstream ends and longitudinal walls, fixed flow-through structure operatively associated respectively with the upstream and downstream valving means adjacent the respective ends of the casing, an access opening through a longitudinal wall of the valve casing, an access door for normally closing the access opening, the backflow discharge means including a tubular discharge passageway means, movable discharge valving means controlling flow communication between the interior of the valve casing and the tubular discharge passageway means, the upstream valving means including movable valving elements, said discharge valving means and said movable valving elements being carried by said tubular discharge passageway means which, in turn, is carried by said access door, and the size of said access opening permitting the discharge valving means and movable valving elements to be swung to a position outwardly of the confines of the valve casing to permit field servicing thereof.

2. A construction as in claim 1 wherein the downstream valving means is secured to fixed flow-through structure by removable means to which access may be had through the access opening.

3. A construction as in claim 1 wherein the discharge valving means and the movable valving elements are normally spring biased upstream, and in combination with a tool insertable through the backflow discharge means for holding the spring biased valving means and valving elements constrained to their assembled condition when the access door is opened.

4. A construction as in claim 3 wherein capture means are provided to engage portions of the tool while other portions of the tool have force applied thereto by the spring bias means to wedge and hold the tool in position against inadvertent withdrawal.

5. A construction as in claim 1 including an annular abutment wall surrounding the access opening, an annular abutment wall defined on the access door, and lost motion hinge means between the door and casing to permit said abutment walls on the casing and door to abuttingly engage to effect a substantial seal therebetween.

6. A construction as in claim 1 including spring means carried by elements supported on the access door and operatively associated with the movable valving elements to resiliently seat said valving elements against said fixed flow-through structure adjacent the upstream end of the valve casing when the access door is closed, whereby to create a reaction force that aids in opening the access door.

7. A construction as in claim 1 including spring means operatively associated with the discharge valving means and the movable valving elements to normally bias same in an upstream direction, a valve stem interconnecting said valving means and valving elements, and a tool for selective capture of the stem to restrain the stem, valving means and valving elements against the bias means.

8. A construction as in claim 1 including spring means operatively associated with the discharge valving means and the movable valving elements to normally bias same in an upstream direction, a valve stem interconnecting said valving means and valving elements, a first tool for entry through the discharge passageway means for capture and restraint of the valving means before the access door is opened, and a second tool for capture of and controlled restraint of the stem after the access door is opened, use of the second tool permitting selective release of the first tool, and use of the first tool permitting selective release of the second tool.

9. A construction as in claim 1 wherein the tubular discharge passageway means carries thereon axially spaced sleeves and a tool-receiving means located axially in a plane between said axially spaced sleeves, the discharged valving means including spaced valves cooperating with said axially spaced sleeves and interconnected by valve stem means extending transversely of the plane of the tool-receiving means, and a restraint tool selectively enterable in the tool-receiving means and presenting a portion to be engaged by one of the spaced valves of the discharge valving means to effect a capture action wherein the tool holds and restrains the discharge valving means against movement and the discharge means simultaneously engages and restrains the restraint tool from withdrawal.

* * * * *